United States Patent
Shaffer

(10) Patent No.: US 10,830,481 B2
(45) Date of Patent: Nov. 10, 2020

(54) DETECTING BLOCKAGE OF AIR CONDITIONER UNIT BASED ON FAN SPEED

(71) Applicant: Haier US Appliance Solutions, Inc., Wilmington, DE (US)

(72) Inventor: Timothy Scott Shaffer, La Grange, KY (US)

(73) Assignee: Haie US Appliance Solutions, Inc., Wilmington, DE (US)

( * ) Notice: Subject to any disclaimer, the term of this patent is extended or adjusted under 35 U.S.C. 154(b) by 106 days.

(21) Appl. No.: 16/169,106

(22) Filed: Oct. 24, 2018

(65) Prior Publication Data

US 2020/0132334 A1 Apr. 30, 2020

(51) Int. Cl.
*F24F 11/87* (2018.01)
*F24F 11/32* (2018.01)
*F24F 11/49* (2018.01)
*F24F 1/027* (2019.01)

(52) U.S. Cl.
CPC .............. *F24F 11/87* (2018.01); *F24F 1/027* (2013.01); *F24F 11/32* (2018.01); *F24F 11/49* (2018.01)

(58) Field of Classification Search
CPC .. F24F 1/027; F24F 11/32; F24F 11/49; F24F 11/74; F24F 11/87; F24F 2221/34
See application file for complete search history.

(56) References Cited

U.S. PATENT DOCUMENTS

| 2016/0061465 A1* | 3/2016 | Billman ................... F24F 1/00 165/121 |
| 2016/0061466 A1* | 3/2016 | Billman ............... F24F 1/0007 165/121 |
| 2016/0061467 A1* | 3/2016 | Billman ................... F24F 1/02 62/56 |

FOREIGN PATENT DOCUMENTS

| CN | 1306693 C | 3/2007 |
| JP | H07180879 A | 7/1995 |
| JP | 2985754 B2 | 12/1999 |
| JP | 3695846 B2 | 9/2005 |
| JP | 6109545 B2 | 4/2017 |
| KR | 20050102913 A | 10/2005 |

\* cited by examiner

*Primary Examiner* — Marc E Norman
(74) *Attorney, Agent, or Firm* — Dority & Manning, P.A.

(57) ABSTRACT

Air conditioner units and methods for operating air conditioner units are provided. A method includes determining a steady state speed of a blower fan of the air conditioner unit. The method further includes receiving a call for heating and activating the blower fan in response to the call for heating. The method further includes measuring a speed of the blower fan after activating the blower fan and comparing the measured speed of the blower fan to the steady state speed of the blower fan. When the measured speed of the blower fan is greater than the steady state speed of the blower fan, the method includes disabling one of a plurality of heater banks of a heating unit of the air conditioner unit.

19 Claims, 5 Drawing Sheets

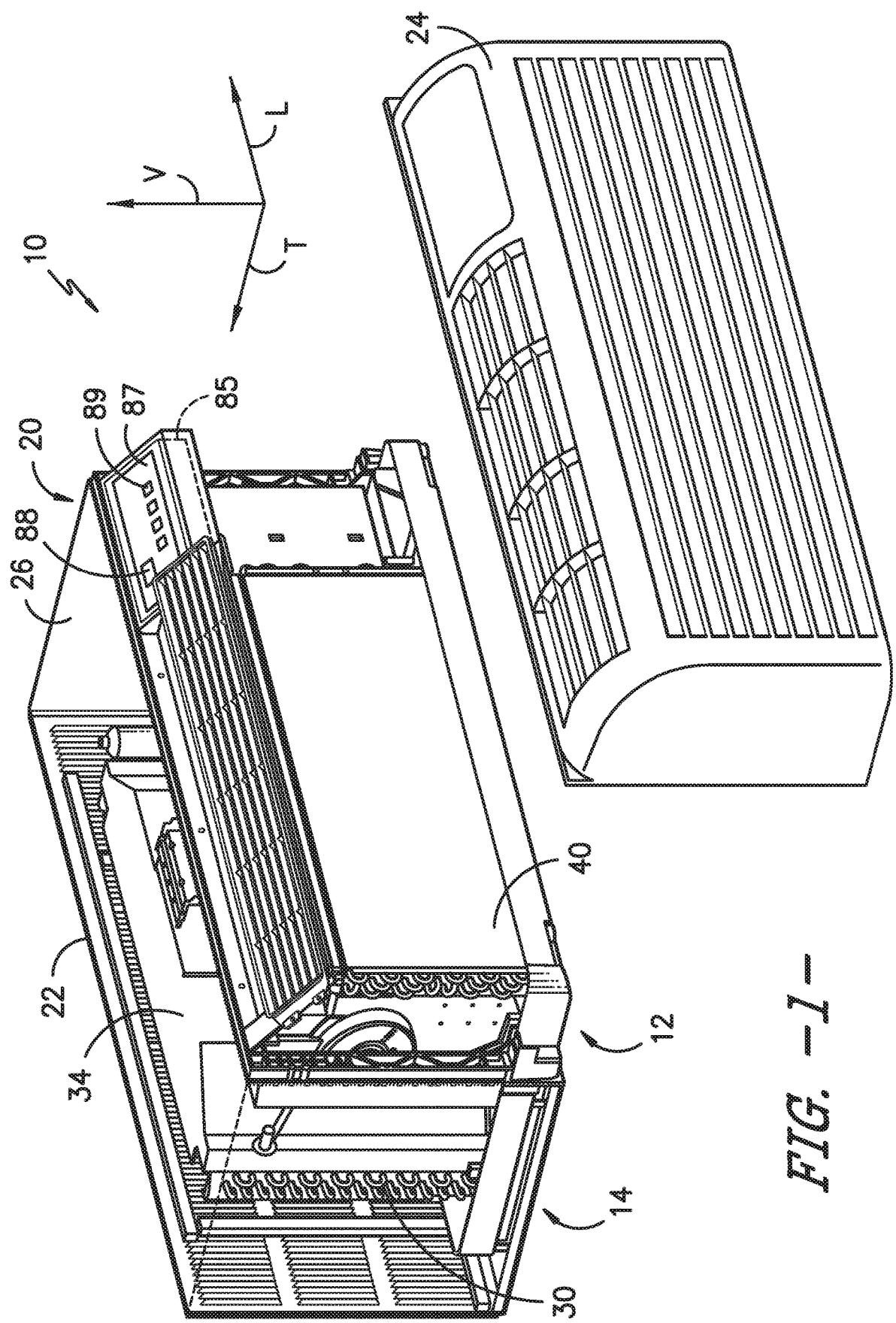
FIG. -1-

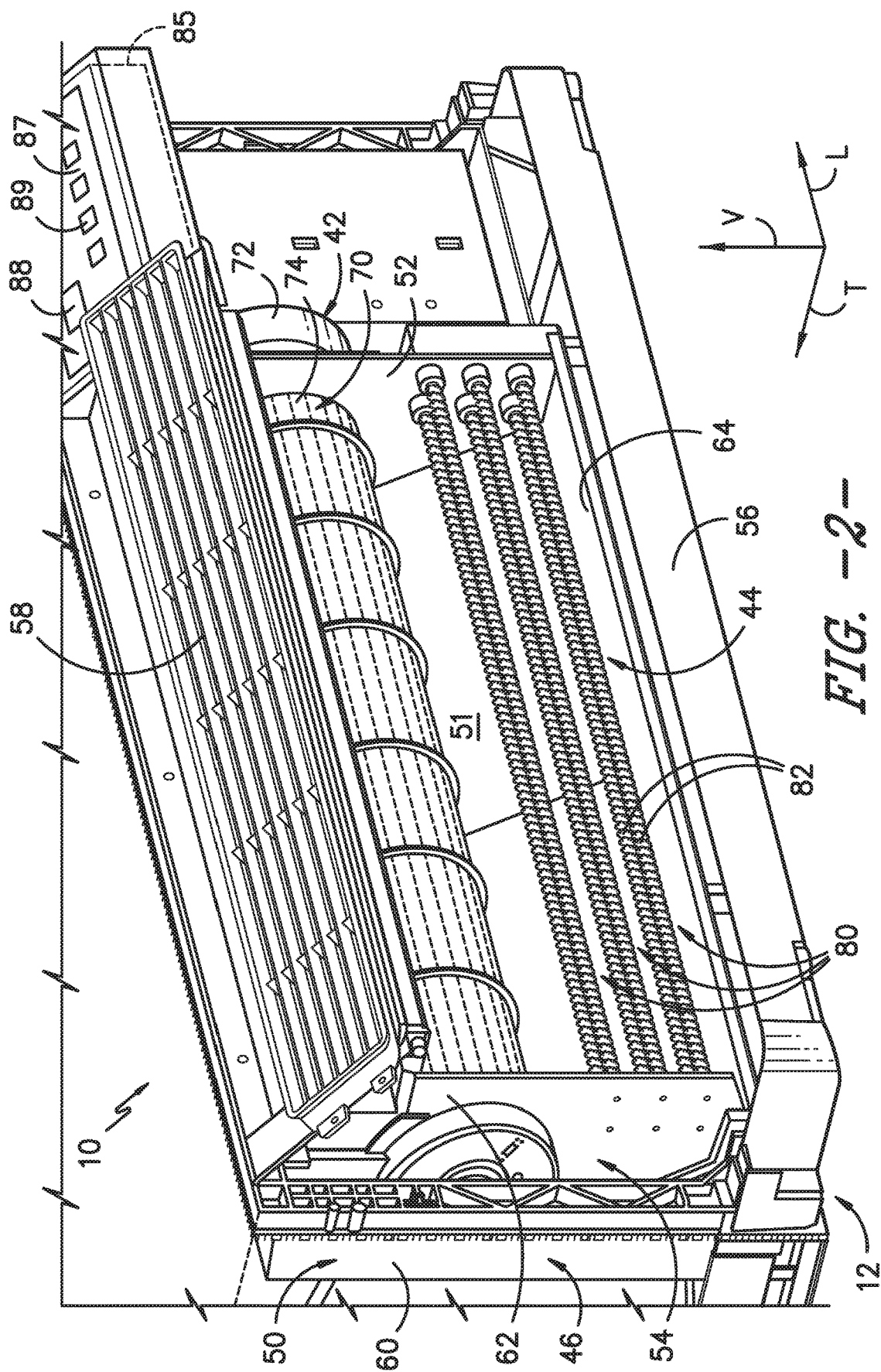
FIG. -2-

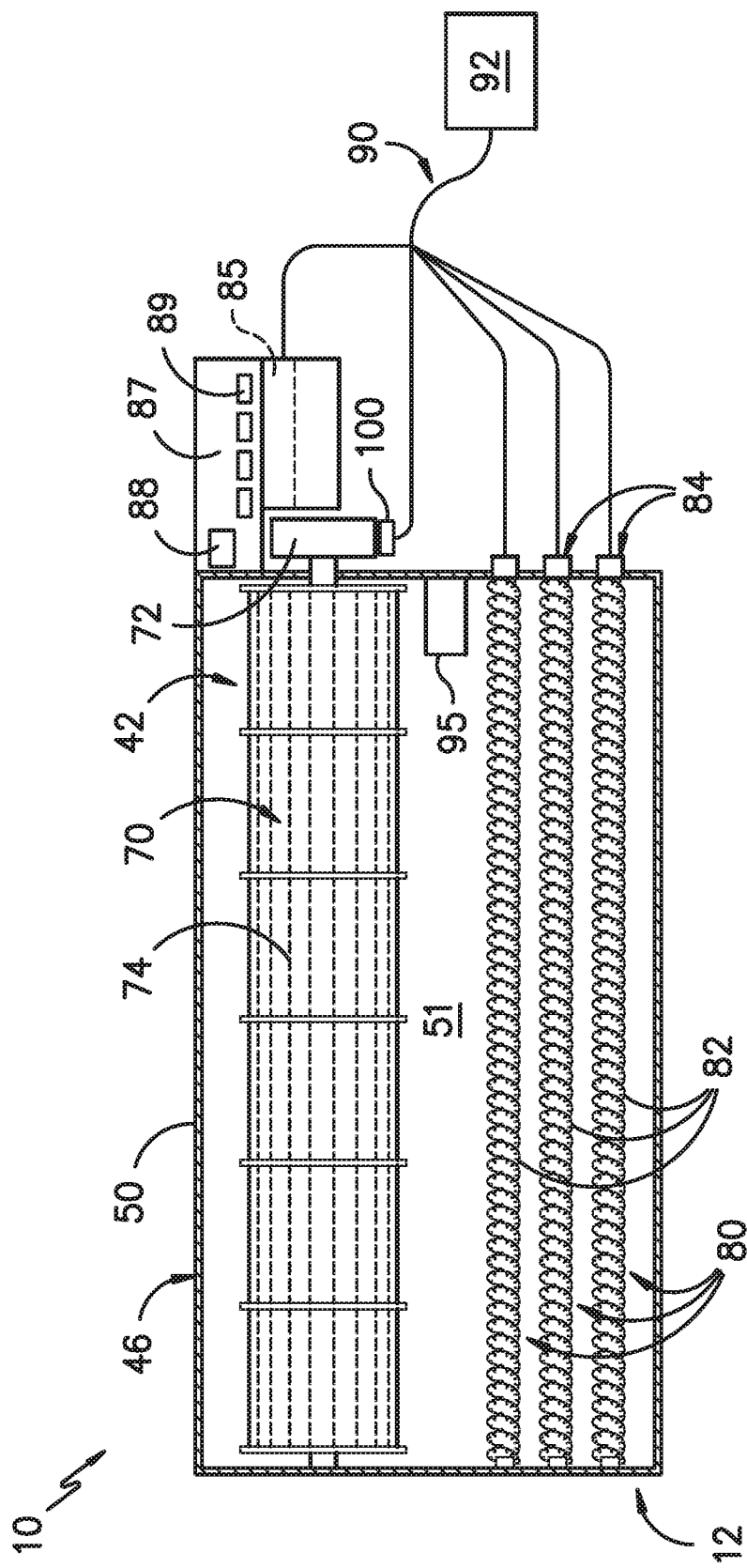
FIG. -3-

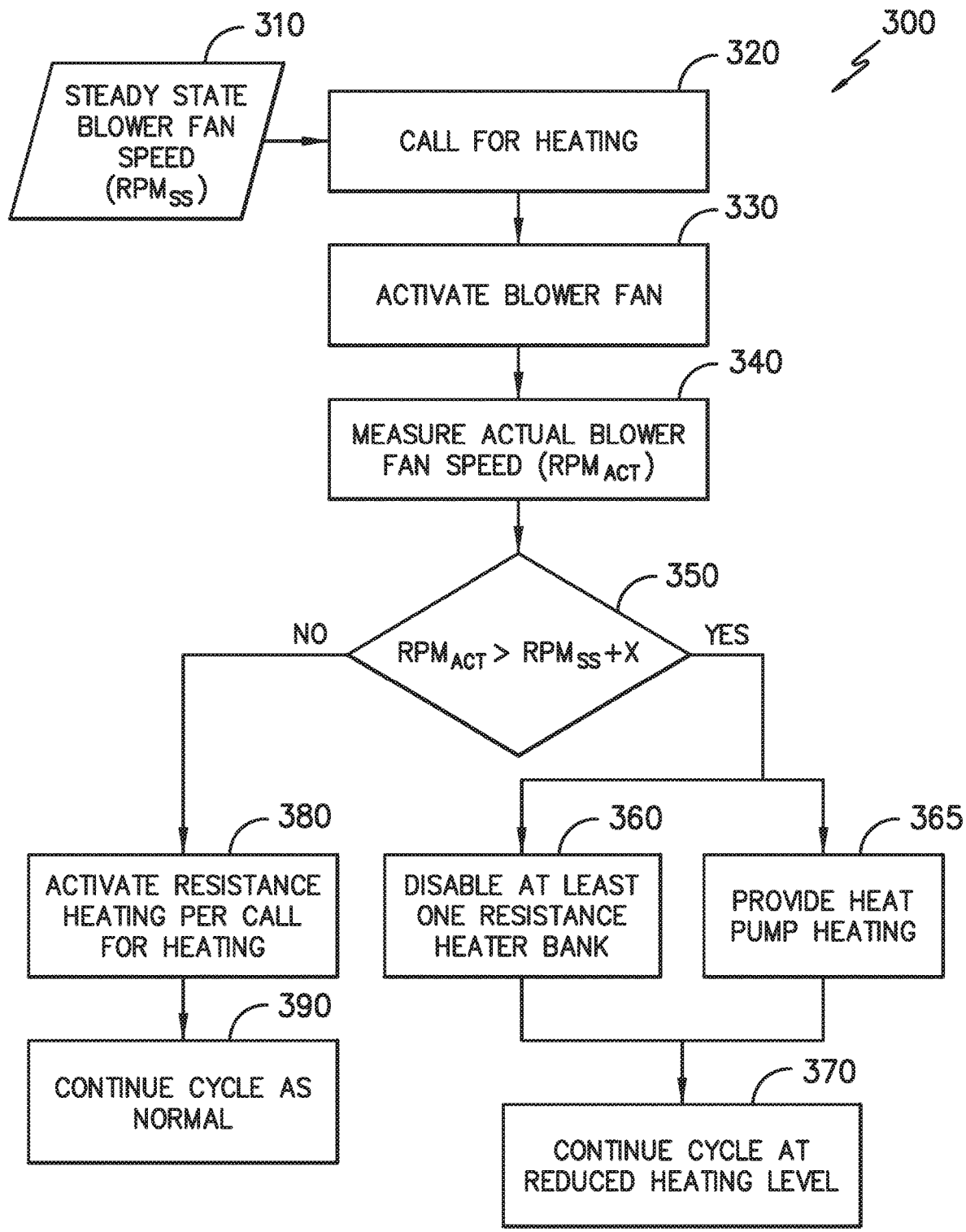
FIG. -4-

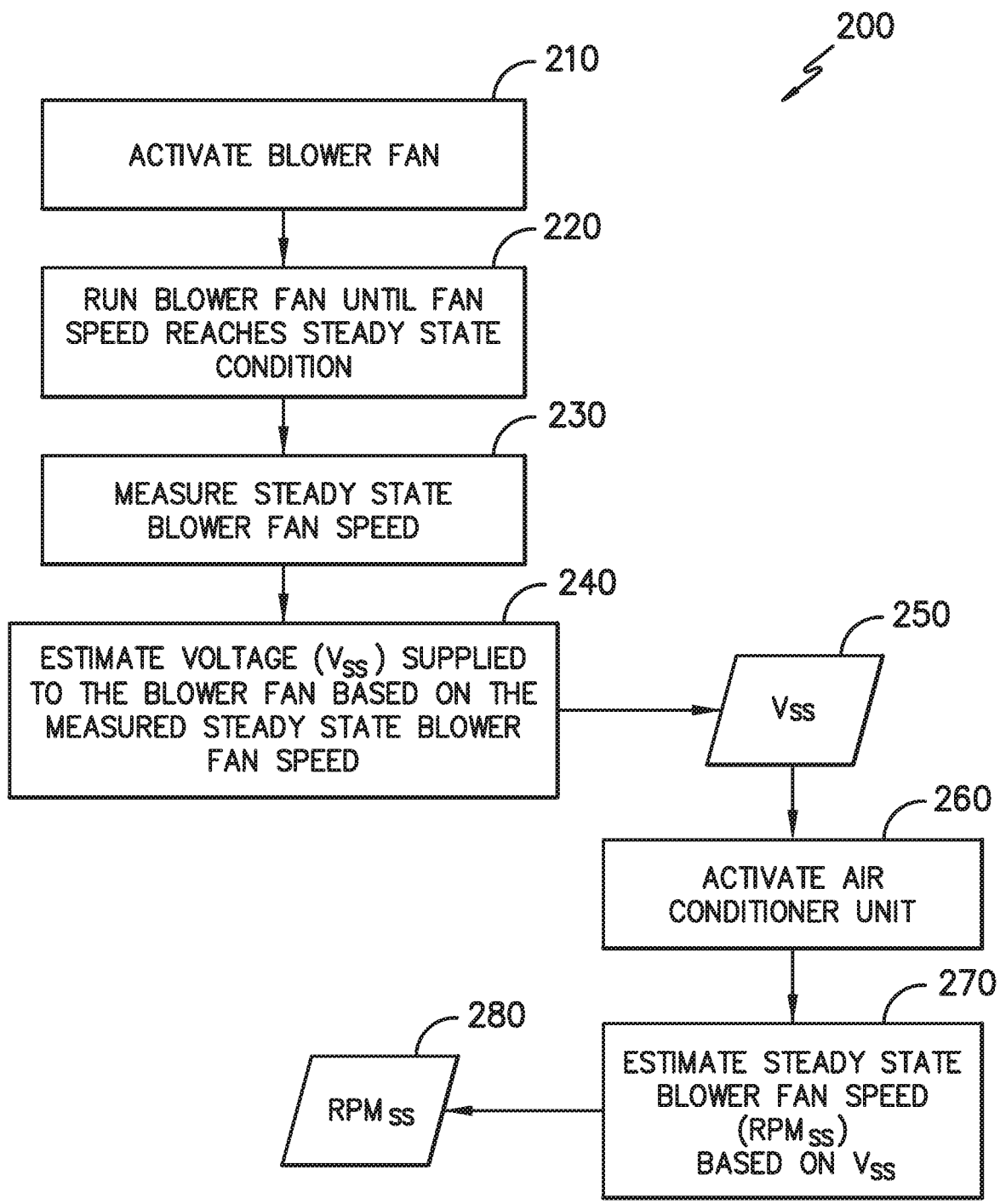
FIG. -5-

DETECTING BLOCKAGE OF AIR CONDITIONER UNIT BASED ON FAN SPEED

FIELD OF THE INVENTION

The present disclosure relates generally to air conditioner units, and more particularly to methods and apparatus for detecting blockage of air conditioner units.

BACKGROUND OF THE INVENTION

Air conditioner units are conventionally utilized to adjust the temperature within structures such as dwellings and office buildings. In particular, one-unit type room air conditioner units may be utilized to adjust the temperature in, for example, a single room or group of rooms of a structure. A typical such air conditioner unit includes an indoor portion and an outdoor portion. The indoor portion is generally located indoors, and the outdoor portion is generally located outdoors. Accordingly, the air conditioner unit generally extends through a wall, window, etc. of the structure.

In the outdoor portion of a conventional air conditioner unit, a compressor that operates a refrigerating cycle is provided. At the back of the outdoor portion, an outdoor heat exchanger connected to the compressor is disposed, and facing the outdoor heat exchanger, an outdoor fan for cooling the outdoor heat exchanger is provided. At the front of the indoor portion of a conventional air conditioner unit, an air inlet is provided, and above the air inlet, an air outlet is provided. A blower fan and a heating unit are additionally provided in the indoor portion. Between the blower fan and heating unit and the air inlet, an indoor heat exchanger connected to the compressor is provided.

When cooling operation starts, the compressor is driven to operate the refrigerating cycle, with the indoor heat exchanger serving as a cold-side evaporator of the refrigerating cycle, and the outdoor heat exchanger as a hot-side condenser. The outdoor heat exchanger is cooled by the outdoor fan to dissipate heat. As the blower fan is driven, the air inside the room flows through the air inlet into the air passage, and the air has its temperature lowered by heat exchange with the indoor heat exchanger, and is then blown into the room through the air outlet. In this way, the room is cooled.

When heating operation starts, the heating unit is operated to raise the temperature of air in the air passage. The air, having had its temperature raised, is blown out through the air outlet into the room to heat the room.

In many currently known air conditioner units, the heating unit is formed from a plurality of heater banks. Each bank may have a different rated power output. The highest output for the unit generally occurs when all heater banks are operating at the same time. Additionally, many currently known air conditioner units have multiple blower fan speed settings. For example, a blower fan may in some cases be operated at a low setting or a high setting, or in some cases at various other intermediate settings.

One concern during operation of air conditioner units is overheating of the unit, particularly if a blockage occurs. For example, a blockage to the air inlet path and/or air outlet path prevents proper airflow from occurring within the unit. Particularly when all heater banks are on and the airflow is low due to blockage, temperatures within the unit can rise significantly, leading to deformation and/or other damage to components of the unit. Particularly vulnerable components include, for example, plastic components of the heater housing.

Accordingly, improved methods and apparatus for operating air conditioner units are desired. In particular, methods and apparatus that detect blockage of the air conditioner unit would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a method for operating an air conditioner unit is provided. The method includes determining a steady state speed of a blower fan of the air conditioner unit. The method further includes receiving a call for heating and activating the blower fan in response to the call for heating. The method also includes measuring a speed of the blower fan after activating the blower fan in response to the call for heating and comparing the measured speed of the blower fan to the steady state speed of the blower fan. When the measured speed of the blower fan is greater than the steady state speed of the blower fan, the method includes disabling one of a plurality of heater banks of a heating unit of the air conditioner unit.

In accordance with another embodiment, an air conditioner unit is provided. The air conditioner unit includes a blower fan, the blower fan comprising a blade assembly and a motor connected to the blade assembly. The air conditioner unit further includes a heating unit, the heating unit comprising a plurality of heater banks. The air conditioner unit further includes a power source in electrical communication with the blower fan motor and the plurality of heater banks, and a controller in operable communication with the motor and the plurality of heater banks. The controller is operable for determining a steady state speed of the blower fan, receiving a call for heating, activating the blower fan after receiving the call for heating, measuring a speed of the blower fan after activating the blower fan, comparing the measured speed of the blower fan to the steady state speed of the blower fan, and disabling one of the plurality of heater banks when the measured speed of the blower fan is greater than the steady state speed of the blower fan.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of an air conditioner unit, with a room front exploded from a remainder of the air conditioner unit for illustrative purposes, in accordance with one or more embodiments of the present disclosure.

FIG. 2 is a perspective view of components of an indoor portion of an air conditioner unit in accordance with one or more embodiments of the present disclosure.

FIG. 3 is a schematic diagram of components of an air conditioner unit in accordance with one or more embodiments of the present disclosure.

FIG. 4 is a flow chart illustrating steps of a method in accordance with one or more embodiments of the present disclosure.

FIG. 5 is a flow chart illustrating steps of a method in accordance with one or more embodiments of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Referring now to FIG. 1, an air conditioner unit 10 is provided. The air conditioner unit 10 is a one-unit type air conditioner, also conventionally referred to as a room air conditioner. The unit 10 includes an indoor portion 12 and an outdoor portion 14, and generally defines a vertical direction V, a lateral direction L, and a transverse direction T. The directions V, L, and T are mutually perpendicular to each other, such that an orthogonal coordinate system is generally defined.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, while the room front 24 is part of the indoor portion 12. Components of the outdoor portion 14, such as an outdoor heat exchanger 30, outdoor fan (not shown), and compressor (not shown) may be housed within the wall sleeve 26. A casing 34 may additionally enclose the outdoor fan, as shown.

Referring now also to FIGS. 2 and 3, indoor portion 12 may include, for example, an indoor heat exchanger 40, a blower fan 42, and a heating unit 44. These components may, for example, be housed behind the room front 24. In at least some embodiments, the unit 10 may also include a reversing valve for reversing a direction of refrigerant flow between the outdoor heat exchanger 30 and the indoor heat exchanger 40 to provide a heat pump operation mode, as is generally understood in the art. Additionally, a heater housing 46 may generally support and/or house various other components or portions of the indoor portion 12, such as the blower fan 42 and the heating unit 44.

Heater housing 46 may have peripheral surfaces 50 that define a housing interior 51. For example, the peripheral surfaces 50 may include a first sidewall 52 and a second sidewall 54 which are spaced apart along the lateral direction L. Peripheral surfaces 50 may additionally include a base pan 56 and an outlet air diverter 58, each of which may extend between the sidewalls 52, 54 along the lateral direction L.

The housing 46 may be formed from one or more components. For example, in exemplary embodiments, the housing 46 may be formed from a bulkhead 60 and a shroud 62. The bulkhead 60 may in some embodiments be formed from a suitable plastic, or alternatively may be formed from any suitable material. The shroud 62 may in some embodiments be formed from a suitable metal, or alternatively may be formed from any suitable material. The shroud 62 may be connected to the bulkhead 60, and the bulkhead 60 and shroud 62 may together include the peripheral surfaces 50. For example, base pan 56 and outlet air diverter 58 may be components of the bulkhead 60, and portions of or entire sidewalls 52, 54 may be components of the shroud 62. Shroud 62 may additionally include an interior shroud base 64, which may for example be disposed within interior 51 adjacent base pan 56.

In exemplary embodiments, blower fan 42 may be a tangential fan. Alternatively, however, any suitable fan type may be utilized. Blower fan 42 may include a blade assembly 70 and a motor 72. The blade assembly 70, which may include one or more blades disposed within a fan housing 74, may be disposed within the interior 51 of the heater housing 46. As shown, blade assembly 70 may for example extend along the lateral direction L between the first sidewall 52 and the second sidewall 54. The motor 72 may be connected to the blade assembly 70, such as through the housing 74 to the blades via a shaft. Operation of the motor 72 may rotate the blades, thus generally operating the blower fan 42. Further, in exemplary embodiments, motor 72 may be disposed exterior to the heater housing 46. Accordingly, the shaft may for example extend through one of the sidewalls 52, 54 to connect the motor 72 and blade assembly 70.

Heating unit 44 in exemplary embodiments includes one or more heater banks 80. Each heater bank 80 may be individually powered, separately from other heater banks 80, to provide heat. In exemplary embodiments, three heater banks 80 may be utilized. Further, each heater bank 80 may in some embodiments have a different rated power level. For example in some embodiments, a heating unit 44 may include a low power heater bank, a medium power heater bank, and a high power heater bank. In some exemplary embodiments, heating unit 44 include a 1000 Watt bank 80, a 1400 Watt bank 80, and a 2400 Watt bank 80. Each heater bank 80 may further include at least one heater coil or coil pass 82, such as in exemplary embodiments two heater coils or coil passes 82. As shown, in exemplary embodiments multiple heater banks 80 may be stacked vertically, and the coils 82 of a heater bank 80 may be arranged side-by-side. Accordingly, in exemplary embodiments wherein each heater bank 80 has two heater coils 82 the coils 82 may be arranged in two columns and three rows as shown.

The operation of air conditioner unit 10, including blower fan 42, heater banks 80, heating coils 82 thereof, and other suitable components, may be controlled by a processing device such as a controller 85. Controller 85 may be in operable communication with, e.g., operably connected to (via for example a suitable wired or wireless connection) such components of the air conditioner unit 10. By way of example, the controller 85 may include a memory and one or more processing devices such as microprocessors, CPUs or the like, such as general or special purpose microprocessors operable to execute programming instructions or microcontrol code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 87 and one or more user inputs 89, which may be included in control panel 87. The user inputs 89 may be in communication with the controller 85. A user of the unit 10 may interact with the user inputs 89 to operate the unit 10, and user commands may be transmitted between the user inputs 89 and controller 85 to facilitate operation of the unit 10 based on such user commands. A display 88 may additionally be provided in the control panel 87, and may be in communication with the controller 85. Display 88 may, for example, be a touchscreen or other text-readable display screen, or alternatively may simply be a light that can be activated and deactivated as required to provide an indication of, for example, an event or setting for the unit, such as when one or more of the heater banks 80 is disabled, as described below.

A power source 90 may supply power to the unit 10 generally, and specifically to the controller 85, fan 42 (and motor 72 thereof) and heater banks 80. Power source 90 may generally be any suitable electrical power source, such as a power cable that is connected to the various components of the unit 10. Power source 90 may interact with a power supply 92, such as the electrical grid, via for example a power outlet and suitable wiring as is generally understood. The power source 90 may thus generally provide the electrical communication between the power supply 92 and the unit 10 generally and components thereof.

Unit 10 may additionally include a temperature sensor 95, which may be disposed within the interior 51 of housing 46 to measure, for example, temperatures during a heating mode when the heating unit 44 generally is active and/or temperature during a cooling mode. Sensor 95 may be in communication with the controller 85, and may provide such temperature readings to the controller 85.

As discussed, improved methods and apparatus for detecting blockage of air conditioner units 10 during operation thereof would be advantageous. Accordingly, the present disclosure is further directed to methods for operating air conditioner units 10. It should further be understood that, in exemplary embodiments, a controller 85 in accordance with the present disclosure may be operable to perform the various methods steps as disclosed herein. Controller 85 may advantageously be in communication with, for example, the motor 72 and the heater banks 80 to facilitate such operation.

Turning now to FIG. 4, a method 300 may thus include, for example, the step 310 of determining a steady state speed ($RPM_{SS}$) of the blower fan 42 of the air conditioner unit 10. In at least some embodiments, the steady state speed ($RPM_{SS}$) may be determined based on an estimated voltage of the power supply 92, e.g., according to method 200 as shown in FIG. 5 and described below. In various embodiments, the $RPM_{SS}$ may be stored in a memory, e.g., the controller 85 may include a memory, as described above, and such memory may be used to store the $RPM_{SS}$ value. In some embodiments, suitable components such as speed sensors, rotational frequency sensors, etc. may be utilized to determine, e.g., measure, the steady state speed ($RPM_{SS}$) of the blower fan 42.

The method 300 may also include a step 320 of receiving a call for heating, e.g., from the controller 85. For example, the call for heating may be in response to a signal from one or more temperature sensors during an automatic mode of operation of the unit 10, and/or may be in response to a user input received via the user inputs 89. When the call heating is received by the air conditioner unit 10 at step 320, the method 300 may include step 330 of activating the blower fan 42. For example, the blower fan 42 may be activated at step 330 by providing a control signal to the blower fan 42, e.g., to the motor 72 thereof. Such control signal may, for example, be a pulse width modulation (PWM) signal. As is generally understood by those of skill in the art, the PWM signal may include a duty cycle which corresponds to the speed of the blower fan 42. For example, the PWM signal provided in step 330 may have a duty cycle of between about fifteen percent (15%) and about thirty percent (30%), such as about twenty-three and a half percent (23.50%).

Method 300 may also include a step 340 of measuring a speed ($RPM_{ACT}$) of the blower fan 42 after activating the blower fan 42 at step 330. In at least some embodiments, step 340 may include measuring $RPM_{ACT}$ following a delay, e.g., of at least about five seconds, after activating the blower fan 42 to allow the fan 42 to come up to speed. The control signal, e.g., PWM signal, provided in step 330 may be continued at least through the measuring step 340 and may be the same as a control signal provided when determining the steady state speed ($RPM_{SS}$) of the blower fan 42. For example, both the steady state speed ($RPM_{SS}$) and the actual speed ($RPM_{ACT}$) of the blower fan 42 may be measured and/or determined while providing a PWM signal having a duty cycle of, e.g., 23.5%, as described above. The step 340 of measuring the actual speed ($RPM_{ACT}$) of the blower fan 42 may include determining an average speed of the blower fan over time, e.g., taking a ten-second average speed of the blower fan 42. For example, the average may be taken over a ten-second window beginning five seconds after initial activation of the blower fan 42, e.g., the measuring step 340 may be performed from about five seconds of operation of the blower fan 42 to about fifteen seconds of operation of the blower fan 42.

Method 300 may further include, for example, the step 350 of comparing the measured speed ($RPM_{ACT}$) of the blower fan 42 to the steady state speed ($RPM_{SS}$) of the blower fan 42. For example, the step 350 may include determining whether the measured speed ($RPM_{ACT}$) is greater than the steady state speed ($RPM_{SS}$), such as whether the measured speed ($RPM_{ACT}$) is greater than the steady state speed ($RPM_{SS}$) by an at least an offset or threshold amount, which is denoted by "X" in FIG. 4. For example, the threshold amount X may be about twenty rotations per minute (RPM) or more, such as about twenty-five RPM or more, such as about thirty RPM or more. When $RPM_{ACT}$ is greater than the steady state speed $RPM_{SS}$, e.g., by at least the threshold amount X, a blockage may be detected.

For example, when airflow through the air conditioner unit 10 is impeded or blocked, the blower fan 42 may essentially spin freely while moving little or no air, e.g., less air than would be moved by the blower fan 42 when the airflow through the air conditioner unit 10 is unimpeded. Accordingly, when the airflow is blocked, the blower fan does 42 does less work, e.g., moves less air than in the unimpeded airflow state, and the power supplied to the blower fan 42 translates into higher rotational speeds. Thus, where the same power is supplied to the blower fan 42 and the speed of rotation increases, a blockage may be detected. For example, when the same PWM signal is provided for measuring the steady state speed ($RPM_{SS}$) and for measuring the actual speed ($RPM_{ACT}$), and $RPM_{ACT}$ is greater than $RPM_{SS}$, such as greater by at least the threshold amount X, a blockage may be detected.

When a blockage is detected, e.g., when the determination at step 350 is positive, the method 300 may include, for example, a step 360 of disabling one of the plurality of heater banks 80 and, optionally, a step 365 of providing heat pump heating (e.g., by actuating a reversing valve as described above) as a supplement to the resistance heating. Thus, the step 360 may include activating one of the heater banks 80 and disabling another of the heater banks 80. Method 300 may further include a step 370 of continuing a cycle at a reduced heating level. In some embodiments, such step 360 may only occur when the measured speed of the blower fan is greater than the steady state speed of the blower fan, such as only when $RPM_{ACT}$ is greater than $RPM_{SS}$ by at least the threshold amount X. In some embodiments, more than one of the heater banks 80 may be disabled. For example, in embodiments having more than one heater bank 80, all but one heater bank 80 may be disabled. As mentioned above, in some embodiments, three heater banks 80 may be provided, each with a different power, such as a low power heater bank, a medium power heater bank, and a high power heater bank. In such embodiments, when the call for heating at step 320 corresponds to or indicates a medium heating setting or a high heating setting, and when a blockage is detected at step 350, the medium power heater bank and the high power heater bank may be disabled at step 360 and the reduced heating level at step 370 may be a low power level, such as about 1000 Watts. Step 360 may include various combinations of disabling the medium power heater bank and/or the high power heater bank while activating only the low power heater bank and/or medium power heater bank. Additionally or alternatively, method 300 may include providing heat pump heating at step 365. For example, all of the heater banks 80 may be disabled and only heat pump heating may be provided when a blockage is detected, or the heat pump heating may be provided in combination with a reduced-power resistance heating level. A reduced-power heating level includes activating fewer of the plurality of heater banks 80 than are called for based on the call for heating at step 320. For example, where the call for heating at step 320 corresponds to or indicates a high heating mode and the high power heater bank is disabled at step 360, the resistance heating provided by the low power heater bank and/or medium power heater bank at steps 360 and 370 in response to the call for a high heating mode at step 320 would be an example of a reduced-power resistance heating level. Method 300 may also include additional steps when a blockage is detected, such as decreasing the speed of the blower fan 42, such as by decreasing the duty cycle of the PWM control signal, when $RPM_{ACT}$ is greater than $RPM_{SS}$.

When the determination at step 350 is negative, the method 300 may include a step 380 of activating the resistance heating, e.g., activating the heating unit 44 of the air conditioner unit 10. As mentioned above, the heating unit 44 may include a plurality of heater banks 80 of varying power levels which may correspond to various heating modes or settings. Thus, step 380 may include activating the resistance heating per the call for heating from step 320, e.g., providing power to each of the one or more heater banks 80 which corresponds to the call for heating received at step 320. For example, activating the high power heater bank, e.g., 2400 Watt bank, at step 380 when the call for heating at step 320 corresponds to or indicates a high heating mode. The method 300 may further include, at step 390, continuing normal operation of the air conditioner unit 10, with no further action taken with respect to presently disclosed methods. The continuation of normal operation in accordance with the present disclosure is generally continuance of operation of the unit 10 in accordance with the present settings, with no adjustments in accordance with the present method.

In some embodiments, method 300 may additionally provide an indication that a heater bank 80 has been disabled. For example, method 300 may further include transmitting a heater bank inactive signal when $RPM_{ACT}$ is greater than $RPM_{SS}$. Such signal may, for example, be transmitted by the controller 85 to, for example, the display 88. Such transmission, and resulting output provided by the display 88, may advantageously provide an indication to a user that a heater bank 80 has been disabled.

Referring now to FIG. 5, an exemplary method 200 of determining the steady state speed of the fan 42 based on a voltage $V_{SS}$ of the power supply 92 is illustrated. Knowing the voltage $V_{SS}$ may be useful to the air conditioner unit 10 for various reasons, in addition to determining the speed of the blower fan 42. Thus, in some embodiments, determining $RPM_{SS}$, such as in the method 200 and in step 310 of the method 300 described above, may include storing $V_{SS}$ in the memory of the controller 85 and calculating $RPM_{SS}$ based on the stored value of $V_{SS}$. In such embodiments, step 350 of the method 300 described above may then include comparing the calculated speed $RPM_{SS}$ with the measured speed $RPM_{ACT}$ to determine if a blockage may be present. Such embodiments may advantageously reduce the memory requirements, by calculating $RPM_{SS}$ based on $V_{SS}$ rather than storing both $V_{SS}$ and $RPM_{SS}$ in the memory where $V_{SS}$ is stored in the memory anyway for additional purposes.

Thus, as shown in FIG. 5, a method of determining $RPM_{SS}$ may include a step 210 of activating the blower fan 42 and a step 220 of running the blower fan 42 until the fan speed reaches a steady state condition, e.g., after a delay of about five seconds to about ten seconds. As mentioned above, a control signal may be provided to the blower fan 42 during and throughout the activating step 210 and the running step 220, e.g., a PWM signal having a duty cycle within the ranges set forth above. Also as mentioned above, the steady state speed may be an average speed over time, e.g., over about ten seconds. Once the steady state condition has been reached, the method 200 may include a step 230 of measuring the steady state blower fan speed $RPM_{SS}$. Based on $RPM_{SS}$ measured at step 230, the voltage $V_{SS}$ supplied to the blower fan 42 may be estimated. For example, fan speed at a given PWM duty cycle may have a generally linear relationship with the input voltage $V_{SS}$ such that $V_{SS}$ can be estimated based on the measured $RPM_{SS}$ by applying a linear function which relates rotational speed of the blower fan 42 to the voltage supplied. Thus, a value of $V_{SS}$ may be output at step 250 from the step 240, and such output may, for example, be stored in the memory of the controller 85. The method 200 may further include a step 260 of activating the air conditioner unit 10, e.g., when an operation cycle of the air conditioner unit 10 is started. After activating the air conditioner unit 10, the method 200 may include a step 270 of estimating $RPM_{SS}$ based on $V_{SS}$. For example, the controller 85 may calculate $RPM_{SS}$ based on a value of $V_{SS}$ stored in the memory of the controller 85, such as the value of $V_{SS}$ from step 250, e.g., by applying the linear relationship described above. The method may then output a value of $RPM_{SS}$ at 280, for example, the calculated value of $RPM_{SS}$ may be used in steps 310 and 350 of the method 300, as described above.

Method 200 may be performed, for example, in a factory setting, and the resulting value(s) for $V_{SS}$ and/or $RPM_{SS}$ may be stored in the memory of the controller 85 before the air conditioner unit 10 is installed. Method 200 may also or instead be performed during initial setup of the air conditioner unit 10 after installation, and/or during maintenance of the air conditioner unit 10 after installation. Thus, the steady state speed at step 240 may be measured under controlled conditions, e.g., in the factory or during maintenance, and the steady state speed at steps 270 and 280 may be calculated or estimated on demand during operation of the air conditioner unit 10, e.g., based on $V_{SS}$ stored in memory. For example, during operation of the air conditioner unit 10 may be any time after the air conditioner unit 10 is activated at step 260, e.g., in a field setting or end-use setting such as after installed in a room of a dwelling or office building (or hotel room, etc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an air conditioner unit, the method comprising:
   determining a steady state speed of a blower fan of the air conditioner unit, wherein the step of determining the steady state speed of the blower fan comprises:
   supplying a control signal to the blower fan;
   measuring a steady state speed of the blower fan after supplying the control signal to the blower fan;
   estimating a voltage supplied to the blower fan based on the measured steady state speed of the blower fan;
   storing the estimated voltage in a memory of the air conditioner unit; and
   determining the steady state speed of the blower fan based on the stored estimated voltage;
   receiving a call for heating;
   activating the blower fan in response to the call for heating by supplying the control signal to the blower fan;
   measuring a speed of the blower fan after activating the blower fan in response to the call for heating;
   comparing the measured speed of the blower fan to the steady state speed of the blower fan; and
   disabling one of a plurality of heater banks of a heating unit of the air conditioner unit when the measured speed of the blower fan is greater than the steady state speed of the blower fan.

2. The method of claim 1, wherein the control signal is a pulse width modulation signal.

3. The method of claim 1, wherein measuring the steady state speed of the blower fan comprises determining an average speed of the blower fan over time and wherein measuring the speed of the blower fan after activating the blower fan in response to the call for heating comprises determining an average speed of the blower fan over time.

4. The method of claim 1, wherein the step of measuring the speed of the blower fan after activating the blower fan in response to the call for heating comprises measuring the speed of the blower fan following a delay after activating the blower fan.

5. The method of claim 1, wherein the step of disabling one of the plurality of heater banks comprises disabling one of the plurality of heater banks when the measured speed of the blower fan is greater than the steady state speed of the blower fan by at least twenty-five rotations per minute.

6. The method of claim 1, further comprising decreasing the speed of the blower fan when the measured speed of the blower fan is greater than the steady state speed of the blower fan.

7. The method of claim 1, wherein the plurality of heater banks comprises a low power heater bank, a medium power heater bank, and a high power heater bank.

8. The method of claim 7, wherein the step of disabling one of the plurality of heater banks comprises disabling the high power heater bank and the medium power heater bank when the measured speed of the blower fan is greater than the steady state speed of the blower fan.

9. An air conditioner unit comprising:
   a blower fan, the blower fan comprising a blade assembly and a motor connected to the blade assembly;
   a heating unit, the heating unit comprising a plurality of heater banks;
   a power source in electrical communication with the blower fan motor and the plurality of heater banks; and
   a controller in operable communication with the motor and the plurality of heater banks, the controller operable for:
   determining a steady state speed of the blower fan, wherein determining the steady state speed of the blower fan comprises:
   supplying a control signal to the blower fan;
   measuring a steady state speed of the blower fan after supplying the control signal to the blower fan;
   estimating a voltage supplied to the blower fan from the power source based on the measured steady state speed of the blower fan;
   storing the estimated voltage in a memory of the air conditioner unit; and
   determining the steady state speed of the blower fan based on the stored estimated voltage when the call for heating is received;
   receiving a call for heating;
   activating the blower fan after receiving the call for heating by supplying the control signal to the blower fan;
   measuring a speed of the blower fan after activating the blower fan;
   comparing the measured speed of the blower fan to the steady state speed of the blower fan; and
   disabling one of the plurality of heater banks when the measured speed of the blower fan is greater than the steady state speed of the blower fan.

10. The air conditioner unit of claim 9, wherein the control signal is a pulse width modulation signal.

11. The air conditioner unit of claim 9, wherein measuring the steady state speed of the blower fan comprises determining an average speed of the blower fan over time and wherein measuring the speed of the blower fan after activating the blower fan comprises determining an average speed of the blower fan over time.

12. The air conditioner unit of claim 9, wherein the step of measuring the speed of the blower fan after activating the blower fan comprises measuring the speed of the blower fan following a delay after activating the blower fan.

13. The air conditioner unit of claim 9, wherein the step of disabling one of the plurality of heater banks comprises disabling one of the plurality of heater banks when the measured speed of the blower fan is greater than the steady state speed of the blower fan by at least twenty-five rotations per minute.

14. The air conditioner unit of claim 9, wherein the controller is further operable for decreasing the speed of the blower fan when the measured speed of the blower fan is greater than the steady state speed of the blower fan.

15. The air conditioner unit of claim 9, wherein the plurality of heater banks comprises a low power heater bank, a medium power heater bank, and a high power heater bank.

16. The air conditioner unit of claim 15, wherein the step of disabling one of the plurality of heater banks comprises disabling the high power heater bank and the medium power heater bank when the measured speed of the blower fan is greater than the steady state speed of the blower fan.

17. A method for operating an air conditioner unit, the method comprising:
   determining a steady state speed of a blower fan of the air conditioner unit;
   receiving a call for heating;
   activating the blower fan in response to the call for heating;
   measuring a speed of the blower fan after activating the blower fan in response to the call for heating;
   comparing the measured speed of the blower fan to the steady state speed of the blower fan;
   disabling one of a plurality of heater banks of a heating unit of the air conditioner unit when the measured speed of the blower fan is greater than the steady state speed of the blower fan; and
   decreasing the speed of the blower fan when the measured speed of the blower fan is greater than the steady state speed of the blower fan.

18. The method of claim 17, wherein the step of measuring the speed of the blower fan after activating the blower fan in response to the call for heating comprises measuring the speed of the blower fan following a delay after activating the blower fan.

19. The method of claim 17, wherein the step of disabling one of the plurality of heater banks comprises disabling one of the plurality of heater banks when the measured speed of the blower fan is greater than the steady state speed of the blower fan by at least twenty-five rotations per minute.

* * * * *